United States Patent
Heranjal et al.

(10) Patent No.: US 12,250,146 B2
(45) Date of Patent: *Mar. 11, 2025

(54) MULTI-TENANT VIRTUAL PRIVATE NETWORK MICROSEGMENTATION

(71) Applicant: Alkira, Inc., San Jose, CA (US)

(72) Inventors: Shreyas Heranjal, San Jose, CA (US); Robin James, Milpitas, CA (US)

(73) Assignee: ALKIRA, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/400,419

(22) Filed: Dec. 29, 2023

(65) Prior Publication Data

US 2024/0137313 A1  Apr. 25, 2024

Related U.S. Application Data

(63) Continuation of application No. 17/933,721, filed on Sep. 20, 2022, now Pat. No. 11,895,019.

(60) Provisional application No. 63/246,291, filed on Sep. 20, 2021.

(51) Int. Cl.
*H04L 45/00* (2022.01)
*H04L 9/40* (2022.01)
*H04L 45/748* (2022.01)

(52) U.S. Cl.
CPC ............ *H04L 45/38* (2013.01); *H04L 45/748* (2013.01); *H04L 63/0272* (2013.01); *H04L 63/20* (2013.01)

(58) Field of Classification Search
CPC ... H04L 45/38; H04L 45/748; H04L 63/0272; H04L 63/20
See application file for complete search history.

(56) References Cited

U.S. PATENT DOCUMENTS

2016/0140363 A1* 5/2016 Chiricescu ............. G06F 21/64 726/1
2016/0373474 A1* 12/2016 Sood ...................... G06F 21/53
2019/0213322 A1* 7/2019 Dehon ................... G06F 9/4401

* cited by examiner

*Primary Examiner* — El Hadji M Sall
(74) *Attorney, Agent, or Firm* — Vani Moodley, Esq.

(57) ABSTRACT

What is disclosed is tagging a first flow of a multi-tenant virtual private network (VPN) with a first tag. Continuously tracking, based on the first tag, the first flow of the multi-tenant VPN. Capturing one or more characteristics of the first flow of the multi-tenant VPN. Categorizing the first flow of the multi-tenant VPN based on the one or more characteristics of the first flow. Providing the categorization of the first flow to a first tenant of the multi-tenant VPN. Receiving, based on input from the first tenant and the categorization of the first flow, a first policy. Enforcing the first policy on the first flow based on the first tag of the first flow and the continuous tracking of the first flow.

20 Claims, 17 Drawing Sheets

MULTI-TENANT VIRTUAL PRIVATE NETWORK MICROSEGMENTATION

CROSS-REFERENCE TO RELATED APPLICATIONS

The present application is a continuation of U.S. patent application Ser. No. 17/933,721 filed Sep. 20, 2022, which claims the benefit of U.S. Provisional Patent Application Ser. No. 63/246,291, filed Sep. 20, 2021 and entitled "Multi-Tenant Virtual Private Network Microsegmentation," which is hereby incorporated by reference herein.

BACKGROUND

Generally, computing systems can operate in networked environments. However, traditional networking approaches are designed for physical networks and may not be appropriate for virtual private networks (VPNs). For example, traditional networking approaches do not provide sufficient customer control over flows in VPN environments.

DETAILED DESCRIPTION

Figure 1:
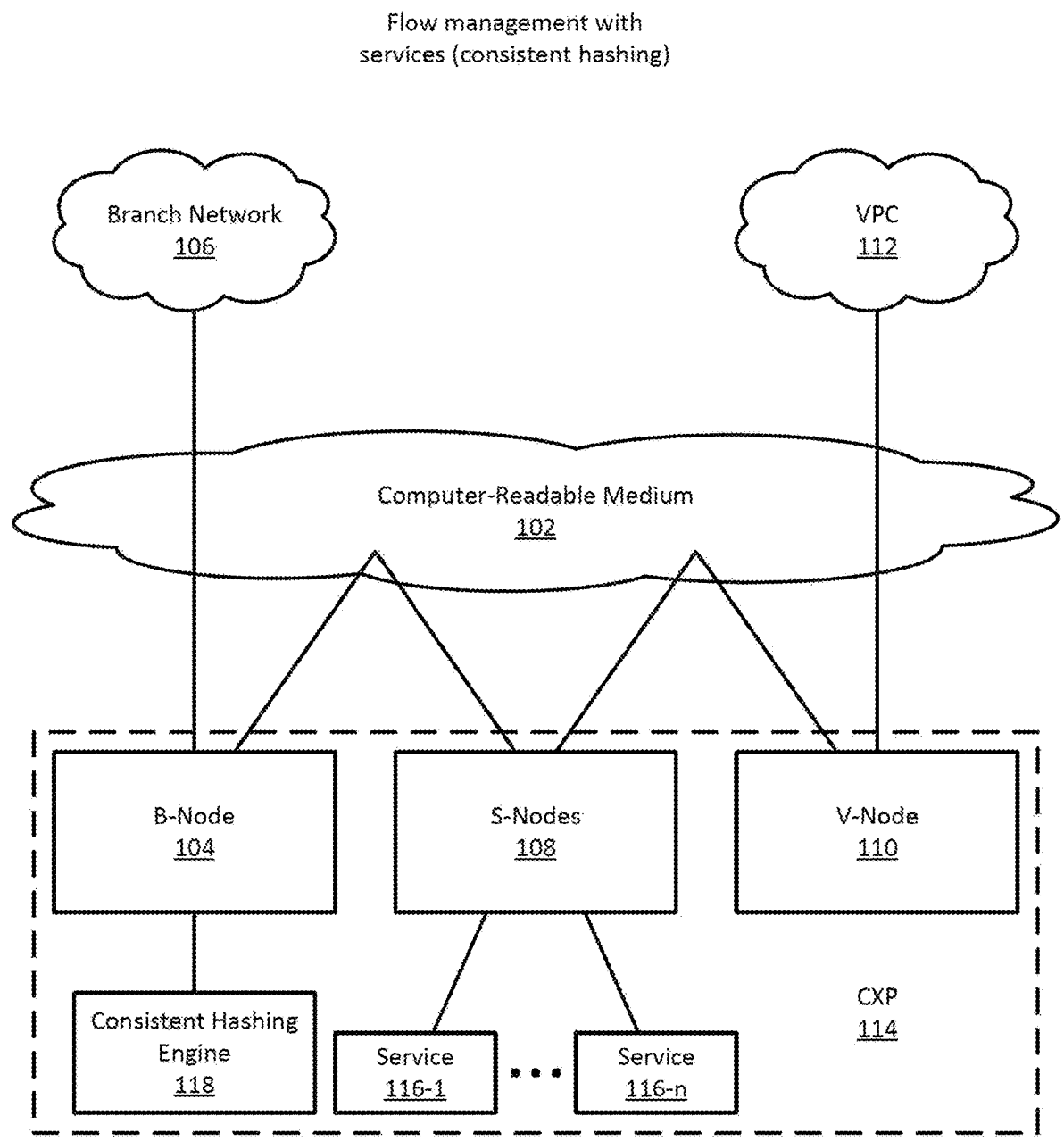
FIG. 1 is a diagram of a system that scales infrastructure as flows increase or decrease.

FIG. 1 is a diagram 100 of a system that scales infrastructure as flows increase or decrease. The diagram 100 includes a computer-readable medium (CRM) 102, a branch-facing node (B-node) 104 coupled to the CRM 102, a branch network 106 coupled to the B-node 104 through the CRM 102, service point attachment nodes (S-nodes) 108 coupled to the CRM 102, a virtual network facing node (V-Node) 110 coupled to the CRM 102, and a virtual private cloud (VPC) 112 coupled to the V-Node 110 through the CRM 102. In the diagram 100, a cloud services exchange platform (CXP) 114 includes the B-node 104, the S-nodes 108, the V-node 110, a service engine 116-1 to a service engine 116-n (collectively, the services 116) coupled to the S-nodes 108, and a consistent hashing engine 118 coupled to the B-node 104.

The CRM 102 in intended to represent a computer system or network of computer systems. A "computer system," as used herein, may include or be implemented as a specific purpose computer system for carrying out the functionalities described in this paper. In general, a computer system will include a processor, memory, non-volatile storage, and an interface. A typical computer system will usually include at least a processor, memory, and a device (e.g., a bus) coupling the memory to the processor. The processor can be, for example, a general-purpose central processing unit (CPU), such as a microprocessor, or a special-purpose processor, such as a microcontroller.

Memory of a computer system includes, by way of example but not limitation, random access memory (RAM), such as dynamic RAM (DRAM) and static RAM (SRAM). The memory can be local, remote, or distributed. Non-volatile storage is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. During execution of software, some of this data is often written, by a direct memory access process, into memory by way of a bus coupled to non-volatile storage. Non-volatile storage can be local, remote, or distributed, but is optional because systems can be created with all applicable data available in memory.

Software in a computer system is typically stored in non-volatile storage. Indeed, for large programs, it may not even be possible to store the entire program in memory. For software to run, if necessary, it is moved to a computer-readable location appropriate for processing, and for illustrative purposes in this paper, that location is referred to as memory. Even when software is moved to memory for execution, a processor will typically make use of hardware registers to store values associated with the software, and a local cache that, ideally, serves to speed up execution. As used herein, a software program is assumed to be stored at an applicable known or convenient location (from non-volatile storage to hardware registers) when the software program is referred to as "implemented in a computer-readable storage medium." A processor is considered "configured to execute a program" when at least one value associated with the program is stored in a register readable by the processor.

In one example of operation, a computer system can be controlled by operating system software, which is a software program that includes a file management system, such as a disk operating system. One example of operating system software with associated file management system software is the family of operating systems known as Windows from Microsoft Corporation of Redmond, Wash., and their associated file management systems. Another example of operating system software with its associated file management system software is the Linux operating system and its associated file management system. The file management system is typically stored in the non-volatile storage and causes the processor to execute the various acts required by the operating system to input and output data and to store data in the memory, including storing files on the non-volatile storage.

The bus of a computer system can couple a processor to an interface. Interfaces facilitate the coupling of devices and computer systems. Interfaces can be for input and/or output (I/O) devices, modems, or networks. I/O devices can include, by way of example but not limitation, a keyboard, a mouse or other pointing device, disk drives, printers, a scanner, and other I/O devices, including a display device. Display devices can include, by way of example but not limitation, a cathode ray tube (CRT), liquid crystal display (LCD), or some other applicable known or convenient display device. Modems can include, by way of example but not limitation, an analog modem, an IDSN modem, a cable modem, and other modems. Network interfaces can include, by way of example but not limitation, a token ring interface, a satellite transmission interface (e.g. "direct PC"), or other network interface for coupling a first computer system to a second computer system. An interface can be considered part of a device or computer system.

Computer systems can be compatible with or implemented as part of or through a cloud-based computing system. As used in this paper, a cloud-based computing system is a system that provides virtualized computing resources, software and/or information to client devices. The computing resources, software and/or information can be virtualized by maintaining centralized services and resources that the edge devices can access over a communication interface, such as a network. "Cloud" may be a marketing term and for the purposes of this paper can include any of the networks described herein. The cloud-based computing system can involve a subscription for services or use a utility pricing model. Users can access the protocols of the cloud-based computing system through a web browser or other container application located on their client device.

A computer system can be implemented as an engine, as part of an engine, or through multiple engines. As used in this paper, an engine includes at least two components: 1) a dedicated or shared processor or a portion thereof; 2) hardware, firmware, and/or software modules executed by the processor. A portion of one or more processors can include some portion of hardware less than all of the hardware comprising any given one or more processors, such as a subset of registers, the portion of the processor dedicated to one or more threads of a multi-threaded processor, a time slice during which the processor is wholly or partially dedicated to carrying out part of the engine's functionality, or the like. As such, a first engine and a second engine can have one or more dedicated processors, or a first engine and a second engine can share one or more processors with one another or other engines. Depending upon implementation-specific or other considerations, an engine can be centralized, or its functionality distributed. An engine can include hardware, firmware, or software embodied in a computer-readable medium for execution by the processor. The processor transforms data into new data using implemented data structures and methods, such as is described with reference to the figures in this paper.

The engines described in this paper, or the engines through which the systems and devices described in this paper can be implemented, can be cloud-based engines. As used in this paper, a cloud-based engine is an engine that can run applications and/or functionalities using a cloud-based computing system. All or portions of the applications and/or functionalities can be distributed across multiple computing devices and need not be restricted to only one computing device. In some embodiments, the cloud-based engines can execute functionalities and/or modules that end users access through a web browser or container application without having the functionalities and/or modules installed locally on the end-users' computing devices.

As used in this paper, datastores are intended to include repositories having any applicable organization of data, including tables, comma-separated values (CSV) files, traditional databases (e.g., SQL), or other applicable known or convenient organizational formats. Datastores can be implemented, for example, as software embodied in a physical computer-readable medium on a general- or specific-purpose machine, in firmware, in hardware, in a combination thereof, or in an applicable known or convenient device or system. Datastore-associated components, such as database interfaces, can be considered "part of" a datastore, part of some other system component, or a combination thereof, though the physical location and other characteristics of datastore-associated components is not critical for an understanding of the techniques described in this paper.

Datastores can include data structures. As used in this paper, a data structure is associated with a way of storing and organizing data in a computer so that it can be used efficiently within a given context. Data structures are generally based on the ability of a computer to fetch and store data at any place in its memory, specified by an address, a bit string that can be itself stored in memory and manipulated by the program. Thus, some data structures are based on computing the addresses of data items with arithmetic operations; while other data structures are based on storing addresses of data items within the structure itself. Many data structures use both principles, sometimes combined in non-trivial ways. The implementation of a data structure usually entails writing a set of procedures that create and manipulate instances of that structure. The datastores, described in this paper, can be cloud-based datastores. A cloud based datastore is a datastore that is compatible with cloud-based computing systems and engines.

Assuming a CRM includes a network, the network can be an applicable communications network, such as the Internet or an infrastructure network. The term "Internet" as used in this paper refers to a network of networks that use certain protocols, such as the TCP/IP protocol, and possibly other protocols, such as the hypertext transfer protocol (HTTP) for hypertext markup language (HTML) documents that make up the World Wide Web ("the web"). More generally, a network can include, for example, a wide area network (WAN), metropolitan area network (MAN), campus area network (CAN), or local area network (LAN), but the network could at least theoretically be of an applicable size or characterized in some other fashion (e.g., personal area network (PAN) or home area network (HAN), to name a couple of alternatives). Networks can include enterprise private networks and virtual private networks (collectively, private networks). As the name suggests, private networks are under the control of a single entity. Private networks can include a head office and optional regional offices (collectively, offices). Many offices enable remote users to connect to the private network offices via some other network, such as the Internet.

The B-Node 104 is intended to represent an engine that couples the branch network 106 to the CXP 114. In a specific implementation, the B-node is responsible for branch-to-cloud traffic. For example, the branch network 106 is intended to represent a campus, site, data center, or other branch network under the control of a customer. In a specific implementation, the B-node 104 creates an overlay to connect a network branch to the cloud. Data traffic originating from the branch network 106 within a given region may be controlled, managed, observed, and evaluated by the CXP 114. In a specific implementation, the customer, or a human or artificial agent thereof, managing the branch network 106, or a portion thereof, can access a single portal to select one or more of the services 116 in connection with a software as a service (SaaS), IaaS, or PaaS offering. In a specific implementation, the B-node 104 (potentially including other B-nodes, not shown) connects the CXP 114 to multiple different branch networks.

The S-nodes 108 are intended to represent multi-tenant node engines adapted to orchestrate the instantiation, hosting, and/or provisioning of the services 116 (selected via a portal accessible in association with the CXP 114) to one or more endpoints on behalf of a customer. S-nodes 108 may host services and apply policies that might otherwise only be available through other cloud platforms, in other regions or otherwise only available with certain connectivity. For instance, if a customer using Cloud Platform A desired certain security features provided by Firewall X service that was only available through Cloud Platform B, the S-nodes 108 may, via an orchestration component, host the Firewall X service for the customer so that the customer may obtain the service as though they were using Cloud Platform B. Even if a customer uses different cloud platforms or has different connectivity throughout different segments of its network, the dashboard of the CXP 114's portal may provide the foregoing features (e.g., monitoring traffic, managing connectivity, etc.) within the same dashboard interface. In a specific implementation, to effectuate these features, all data traffic is routed through the S-nodes 108.

The S-nodes 108 may send/receive traffic to and from networks implementing any type of connectivity (e.g., MPLS, SD-WAN, $IP_{SEC}$, etc.) and host services from any one or more providers so that the connecting networks may receive the benefit of those services without the hassle of reconfiguring their network to adapt to the service provider's requirements. The S-nodes 108 can instantiate such services automatically upon request, so that an individual user associated with or connected through the branch network 106 does not have to instantiate the services themselves. The S-nodes 108 may collect telemetry data (e.g., to share with a multi-tenant orchestrator component), may tie the data flow to an application once packet details have been determined, may conduct analytics (e.g., statistical analysis) on data flow on a tailored basis (e.g., one in every ten packets received may be subjected to a deep packet inspection routine), and may tag or add instructions to packets for execution at a workload.

The V-Node 110 is intended to represent an engine that couples the CXP 114 to the VPC 112. The VPC 112 is intended to represent a SaaS, IaaS, PaaS, or V-net. In a specific implementation, the V-node is responsible for cloud-to-cloud traffic. For example, the V-node 110 (potentially including other V-nodes, not shown) connects the CXP 114 to different clouds.

The consistent hashing engine 118 is intended to represent an engine that computes an S-Node index using a function Consistent_Hash (S1, . . . , Sn). In a specific implementation, the CXP 114 has a stateful elastic service plane that is highly redundant and scales horizontally. Thus, the CXP 114 can host stateful services and scale the services horizontally. Stateful services expect forward and reverse traffic of a flow to map to the same service node. Consistent hashing (e.g., google maglev) with flow learning (e.g., AcHash) can be used to meet the packet steering requirements. Ingress and egress nodes compute (via the consistent hashing engine 118) symmetric hash and arrive at the same service plane node for a given flow. Advantageously, addition or removal (including failure) of nodes has minimal impact on existing flows.

In a specific implementation, the consistent hashing engine 118 computes an S-Node index for traffic from branch ("forward flow") and the B-Node 104 steers traffic to a first S-Node of the S-Nodes 108 as described with reference to FIG. 2. In an L3 context a number of hashes equal to the number of S-nodes can be computed for a flow using a 5-tuple from fields in the header of a packet: {source IP address ("src-ip"), destination IP address ("dst-ip"), source port ("src-port"), destination port ("dst-port"), protocol}. Similarly, the consistent hashing engine 118 computes an S-Node index for traffic from cloud ("reverse flow") using symmetric hash and the V-node 110 steers traffic to the first S-Node of the S-Nodes 108 as described with reference to FIG. 2. For example, a symmetric hash can order IP addresses and ports by sorting, so the forward and reverse packets for a flow arrive at the same hash. S-Nodes 108 can use the same technique for steering traffic to firewalls and/or other stateful functions.

The CXP 114 is intended to represent a system that establishes connectivity, instantiates services for corresponding geolocations, aggregates data, implements policies, monitors traffic, and/or provide analytics across disparate cloud service providers and different connectivity architectures. In a specific implementation, CXP 114 operates in a manner that—to the customer—is connectivity agnostic and cloud provider agnostic. The CXP 114 may correspond to aggregated services offered for a given region or set of regions, where the regions may comprise one or more zones corresponding to subsections of such regions. The CXP 114 may service the branch network 106 within a particular region, and multiple CXPs may be stitched together as part of a larger cloud servicing network (e.g., mesh network, hub-and-spoke network, or a network having some other topology) to span multiple regions. In a specific implementation, the CXP 114 provides a portal through which a network administrator or other user associated with a customer may (i) view and select SaaS/IaaS/other services from a range of providers (or provided by the customer itself) within a common dashboard, (ii) manage connectivity (e.g., MLPS, SD-WAN, $IP_{SEC}$, etc.), (iii) monitor traffic, (iv) control traffic in accordance with one or more policies (e.g., security policies), etc.

Figure 2:
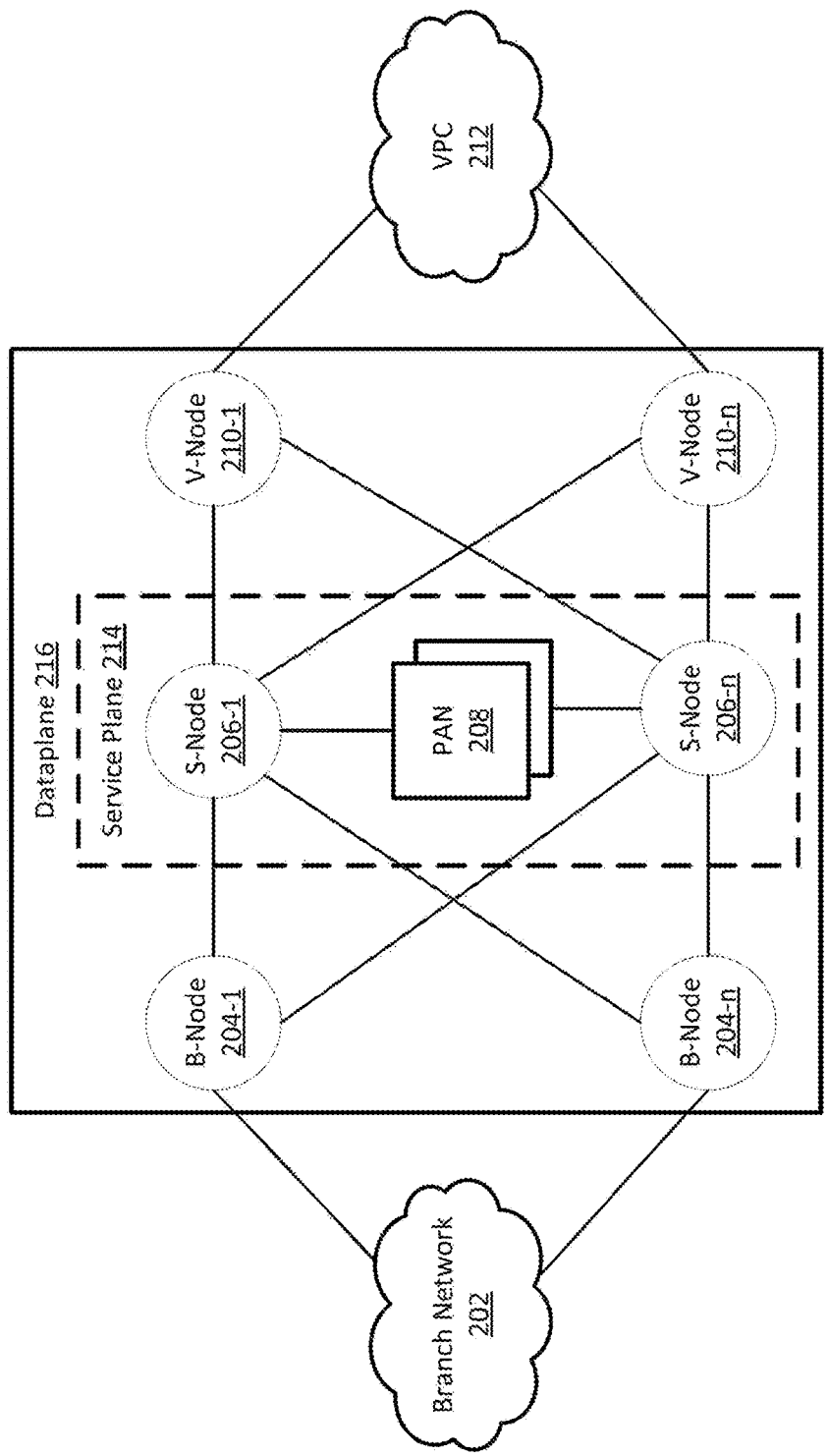
FIG. 2 is a diagram illustrating forward and reverse flows.

FIG. 2 is a diagram 200 illustrating forward and reverse flows. The diagram 200 includes a branch network 202, a B-node 204-1 to a B-node 204-n (collectively, the B-nodes 204) coupled to the branch network 202, an S-node 206-1 to an S-node 206-n (collectively, the S-nodes 206) coupled to the B-nodes 204, processing area networks (PANs) 208 coupled to the S-nodes 206, a V-node 210-1 to a V-node 210-n (collectively, the V-nodes 210) coupled to the S-nodes 206, and a VPC 212 coupled to the V-nodes 210. It may be noted that 'n' may or may not be indicative of the same number of each type of illustrated node.

The branch network 202 is similar to the branch network 104 of FIG. 1 and the VPC 212 is similar to the VPC 112 of FIG. 1. The S-nodes 206 and the PANs 208 can be referred to as a service plane 214. The B-nodes 204, service plane 214, and V-nodes 210 can be referred to as a dataplane 216. As illustrated in the diagram 200, the dataplane 216 operationally connects the branch network 202 to the VPC 212 with multiple sets of nodes. An example of a data plane 216 is an ALKIRA CLOUD SERVICE NODE (CSN)™ dataplane, which is a collection of nodes that moves customer traffic between connectors and through various service functions using a series of overlay tunnels. In a specific implementation, the dataplane 216 is multi-path but supports application identification, stateful policy, and service steering which are stateful functions. The fundamental challenge with multi-path and stateful processing is that the forward and reverse flow of a connection can land in different nodes causing the functionality to break. Accordingly, in the example of FIG. 2, multiple nodes are illustrated.

The B-nodes 204 are intended to represent a collection of engines, including traffic handling engines from connectors to and from the branch network 202. The S-nodes 206 are intended to represent a collection of engines, including engines for executing stateful functions and service steering. The V-nodes 210 are intended to represent a collection of engines, including traffic handling engines from connectors to and from the VPC 212. Each type of node can be independently scaled for resiliency reasons and/or to achieve higher scale, as is described later.

In an example of operation, a forward flow from a source in the branch network 202 (e.g., originating at a client behind an SDWAN) to a destination (e.g., a server) in the VPC 212, for illustrative purposes, traverses the B-node 204-1, the S-node 206-1, and the V-node 210-1. In addition, the forward flow can be characterized as passing from the S-node 206-1 to the PANs 208 and back to the S-node 206-1 before passing to the V-node 210-1.

In this example of operation, a stateful processing reverse flow traverses the V-node 210-1, the S-node 206-1, and the B-node 204-1 when passing from what was the destination (e.g., the server) to what was the source (e.g., the client). In addition, the stateful reverse flow can be characterized as passing from the S-node 206-1 to the PANs 208 and back to the S-node 206-1 before passing to the B-node 204-1. In a specific implementation, stateful reverse flow is achieved by configuring a VB node (e.g., the B-node 204-1 and the V-node 210-1) with an identical set of S-nodes (e.g., the S-nodes 206). Advantageously, if B-node 204-1 goes down, another of the B-nodes 204 can use the hash to maintain flow identity in a stateless way, though flow identity (state) is still maintained on the service plane 214. It may be desirable for the B-nodes 204 to maintain state for efficiency, but there are multiple ingress nodes and a hit node can compute the hash in exactly the same way, making the maintenance of state at the B-nodes 204 optional, assuming an implementation in which the B-nodes 204 are just used for steering traffic.

Figure 3:
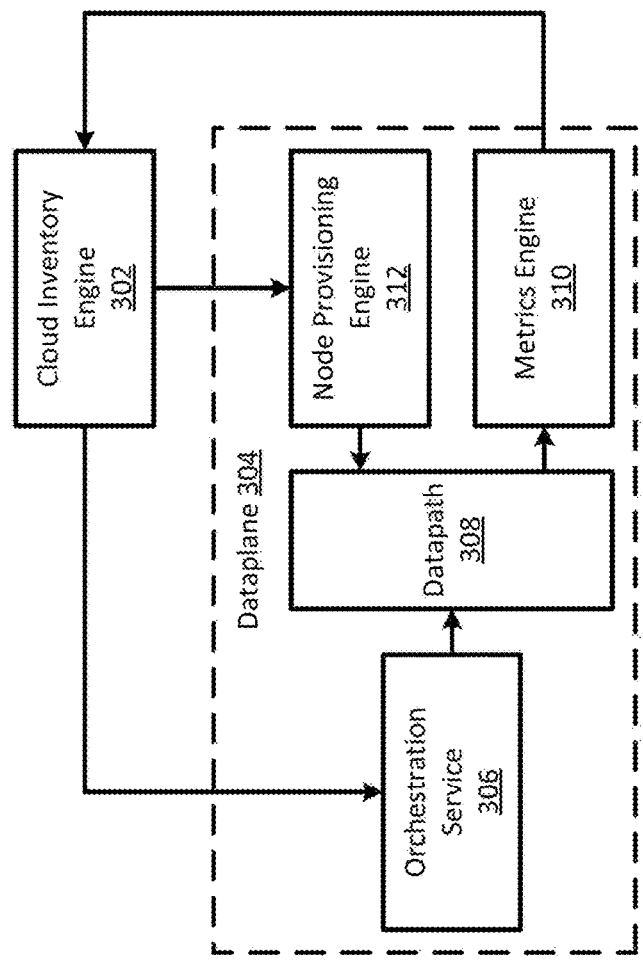
FIG. 3 is a diagram of a system with rapid node provisioning.

A system with a stateful flow identity is capable of rapid S-node provisioning. FIG. 3 is a diagram 300 of a system with rapid node provisioning. The diagram 300 includes a cloud resource inventory system 302 and a dataplane 304 coupled to the cloud inventory system 302. The dataplane 304 includes an orchestration service 306 coupled to the cloud resource inventory system 302, a datapath 308 coupled to the orchestration service 306, a metrics engine 310 coupled to the datapath 308 and the cloud resource inventory system 302, and a node provisioning engine 312 coupled to the cloud resource inventory system 302 and the datapath 308.

The cloud resource inventory engine 302 is intended to represent a collection of engines including an application programming interface (API), a tenant provisioning system (TPS), a resource manager, a monitoring engine, and inventory. Inventory can include qualified instance types for various nodes (e.g., v/b nodes, S-nodes, PANs), dataplane limits by provider (e.g., AWS may provide 25 Gbps per VPC and/or other VPC limits), qualified versions/AMI images for $3^{rd}$ party services (e.g., Cisco SDWAN/PAN), and defined constraints for nodes or instance type combinations (e.g., max tenants for an S-node or an oversubscription factor).

The orchestration system 306 is intended to represent a collection of engines including, for example, a capacity planning engine with tenant and connector limits used to dimension the dataplane 308 (leaving room for future growth) and a connector placement engine. In a specific implementation, the capacity planning engine facilitates short-term growth by generating an alert when a load threshold (e.g., 80% capacity) is reached to trigger rapid node provisioning. In a specific implementation, the capacity planning engine facilitates long-term growth by evaluating moving a tenant out to a new dataplane or stretch a dataplane across multiple VPCs. In a specific implementation, the connector placement engine takes advantage of connectors having a desired number of paths defined in inventory (each path modeled as an incoming tunnel to dataplane nodes) to enable a resource manager to pick a least loaded node for tunnel placement. Connectors can be stitched to V- or B-nodes as per desired paths and multiple paths from connectors to the dataplane 308 achieve desired redundancy levels and performance (e.g., via equal cost multipath (ECMP) routing). Tunnels from connectors can be rate limited at ingress and infra-node connectivity is a mesh that can be designed for high availability.

The datapath 308 is intended to represent multiple independently scalable components. In a specific implementation, autoscaling (up or down) of S-nodes has no impact on connectors but each S-node has an associated monetary value that depends upon an associated business model, both to a customer as a value add and to the dataplane provider as a service to the customer. In a specific implementation, autoscaling of V/B nodes or connectors has impact on customers as EIPs are hosted there; because connectors have two paths, one path can be moved to a new node along with EIPs. In a specific implementation, autoscaling tenants impacts S-nodes and PAN; tenants are stretched to new nodes as the tenant grows. In a specific implementation, PAN recommendation guidelines are used to trigger autoscaling of services.

The metrics engine 310 is intended to represent an engine that collects metrics for components of the datapath 308. In a specific implementation, metrics for S-nodes and PAN includes sessions, throughput, descriptor usage, and memory usage; metrics for V/B nodes include throughput; and metrics for connectors include bandwidth. Metrics are provided to the cloud resource inventory engine 302, which informs communications to the orchestration service 306.

The node provisioning engine 312 is intended to represent an engine that autoscales PAN, S-node, connector, tenant, or other components of the datapath 308. As describe previously, consistent hashing facilitates consistent flows (that is, new flows can go through a new S-node but old flows are directed through a specific S-node or redirected if the specific S-node goes down) and stateful service, providing advantages such as scaling infrastructure to match flow (without dropping packets or reducing the risk thereof) without a need to deploy maximum capacity, which is normally challenging with stateful service. Because spinning up a node takes time, it is frequently undesirable to wait for 100% capacity, so a system may be set to spin up a new node at, say, 60% capacity, business intelligence can be used to determine an ideal spin up threshold (e.g., by historical traffic patterns, time of day, day of week, holiday, or the like), or a customer can pay a premium to spin up a new node at a lower threshold than a non-premium customer, typically using a function of cost to the dataplane provider to lower the threshold. It may be noted that node provisioning can include unprovisioning nodes to shrink capacity, which may result in cessation of flows to certain S-nodes. A flow can terminate after a time (e.g., the flow might go away in 10 minutes) and it may be desirable to drop some flows, forcing a restart of the flow, but it is generally desirable to minimized the dropping of flows. Depending upon implementation-, configuration-, or preference-specific parameters, customers could prohibit the dropping of flows, though that would be at a cost to the dataplane provider, which would likely be passed on to the customer. In a specific implementation, one or more baseline S-nodes are up at all times and other S-nodes, which can be referred to as "incremental S-nodes," stay up at least 30 minutes; smaller increments have a cost and you generally don't want to react on spikes but this is balanced against more granularity being better to avoid wasting resources.

Figure 4:
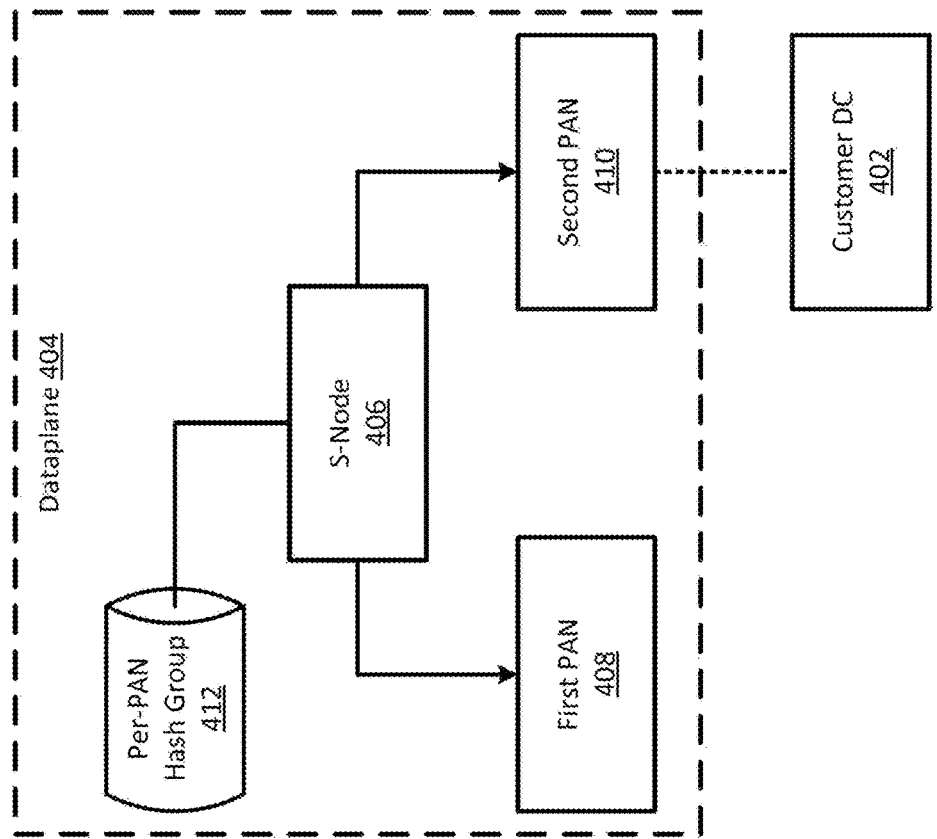
FIG. 4 is a diagram of a PAN autoscaling system.

FIG. 4 is a diagram 400 of a PAN autoscaling system. The diagram 400 includes a customer DC 402 and a dataplane 404 coupled to the customer DC 402. The dataplane 404 includes an S-node 406, a first PAN 408 coupled to the S-node 406, a second PAN 410 coupled to the S-node 406 and the customer DC 402, and a per-PAN hash group datastore 412 coupled to the S-node 406. For illustrative purposes, it is assumed the first PAN 408 is already instantiated, the per-PAN hash group datastore 412 includes a consistent hash for the first PAN 408, and the second PAN 410 is instantiated in the manner described in the following paragraph.

In order to autoscale PAN, the second PAN 410 is instantiated and configured to pull policy from the customer DC 402. The second PAN 410 is marked active after the policy download and the second PAN 410 is represented in the per-PAN hash group datastore 412, which maintains hash groups for PANs on S-nodes. Advantageously, autoscaling in this manner ensures existing flows are not adversely affected.

Figure 5:
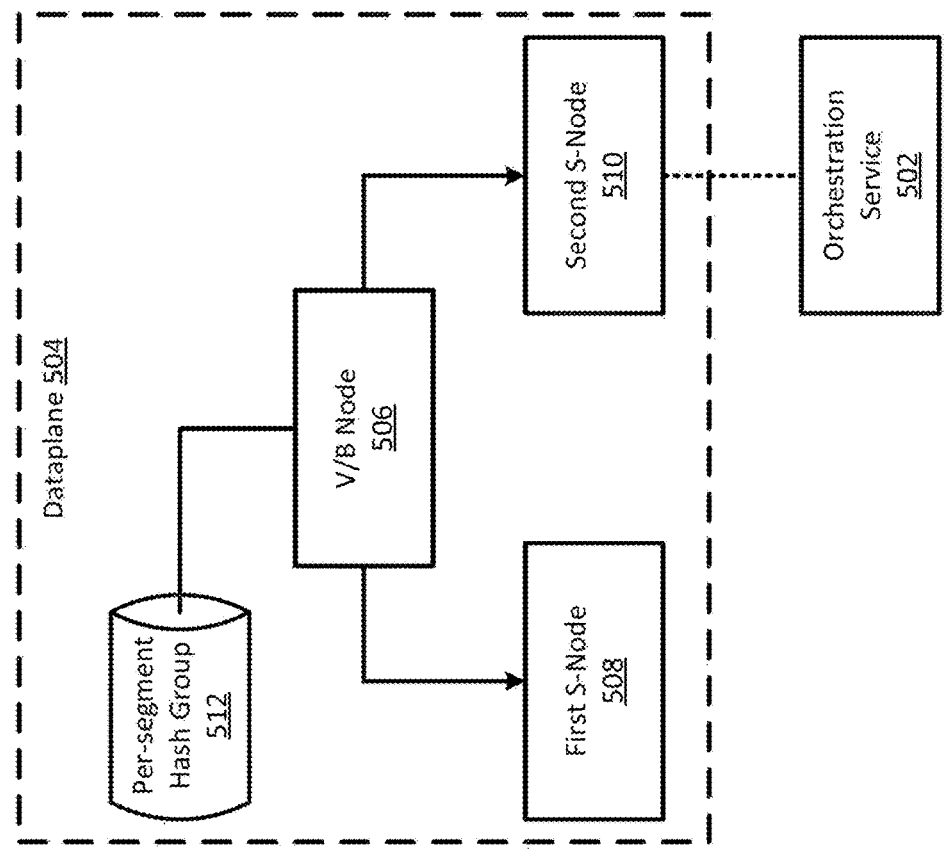
FIG. 5 is a diagram of an S-node autoscaling system.

FIG. 5 is a diagram 500 of an S-node autoscaling system. The diagram 500 includes an orchestration service 502 and a dataplane 504 coupled to the orchestration service 502. The dataplane 504 includes a V/B node 506, a first S-node 508 coupled to the V/B node 506, a second S-node 510 coupled to the V/B node 506 and the orchestration service 502, and a per-segment hash group datastore 512 coupled to the V/B node 506. For illustrative purposes, it is assumed the first S-node 508 is already instantiated, the per-segment hash group datastore 512 includes a consistent hash for segments of the first S-node 508, and the second S-node 510 is instantiated in the manner described in the following paragraph.

In order to autoscale S-node, the second S-node 510 is instantiated, and tenant configuration and policies are configured from the orchestration service 502. The second S-node 510 is marked active after tenant and policy configuration and segments of the second S-node 510 are represented in the per-segment hash group datastore 512, which maintains hash groups for segments of the S-nodes on V/B nodes. Advantageously, autoscaling in this manner ensures existing flows are not adversely affected.

Figure 6:
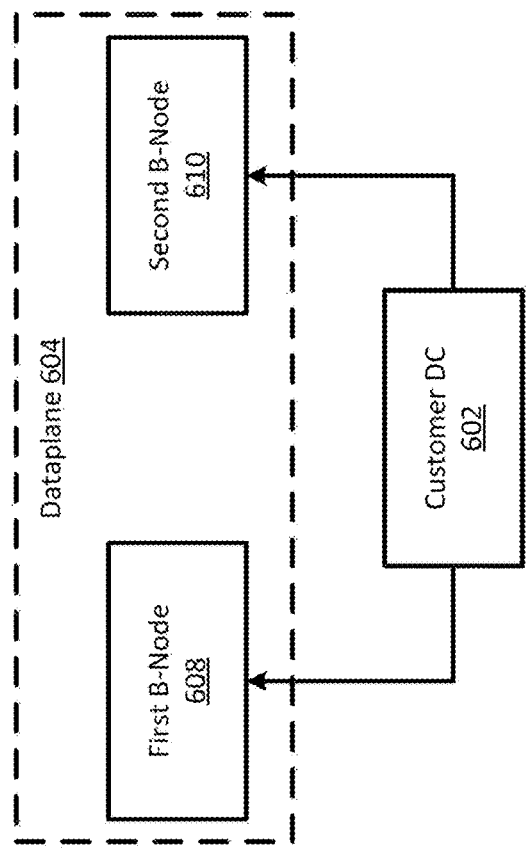
FIG. 6 is a diagram of a connector autoscaling system.

FIG. 6 is a diagram 600 of a connector autoscaling system. The diagram 600 includes a customer DC 602 and a dataplane 604 coupled to the customer DC 602. The dataplane 604 includes a first B-node 608 and a second B-node 610, both of which are coupled to the customer DC 602. Unlike autoscaling described in the previous figures, scale-out has been found to work poorly for connectors; scale-up works better. Connectors have multiple paths (tunnels) into the dataplane 604. Connector bandwidth can be monitored to scale up connectors.

Figure 7:
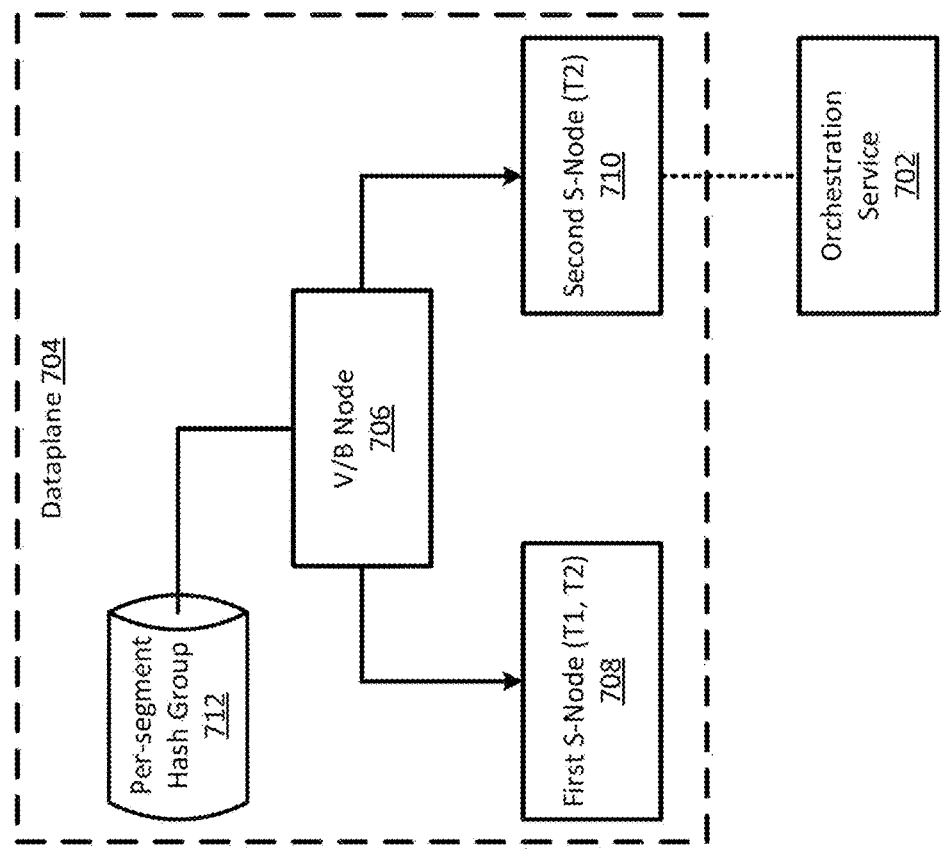
FIG. 7 is a diagram of a tenant autoscaling system.

FIG. 7 is a diagram 700 of a tenant autoscaling system. The diagram 700 includes an orchestration service 702 and a dataplane 704 coupled to the orchestration service 702. The dataplane 704 includes a V/B node 706, a first S-node 708 coupled to the V/B node 706, a second S-node 710 coupled to the V/B node 706 and the orchestration service 702, and a per-segment hash group datastore 712 coupled to the V/B node 706. For illustrative purposes, it is assumed the first S-node 708 is already instantiated for two tenants, T1 and T2, the per-segment hash group datastore 712 includes a consistent hash for segments of the first S-node 708, and the second S-node 710 is instantiated in the manner described in the following paragraph.

In order to autoscale tenants, the second S-node 710 is instantiated for the tenant T2, and tenant configuration and policies are configured from the orchestration service 702 for the tenant T2. In a specific implementation, the second S-node 710 can be an already instantiated S-node capable of handling incremental capacity associated with the tenant T2. The second S-node 710 is marked active after tenant and policy configuration and segments of the second S-node 710 are represented in the per-segment hash group datastore 712, which maintains hash groups for segments of the S-nodes that belong to a tenant on V/B nodes. Advantageously, autoscaling in this manner ensures existing flows are not adversely affected.

Figure 8:
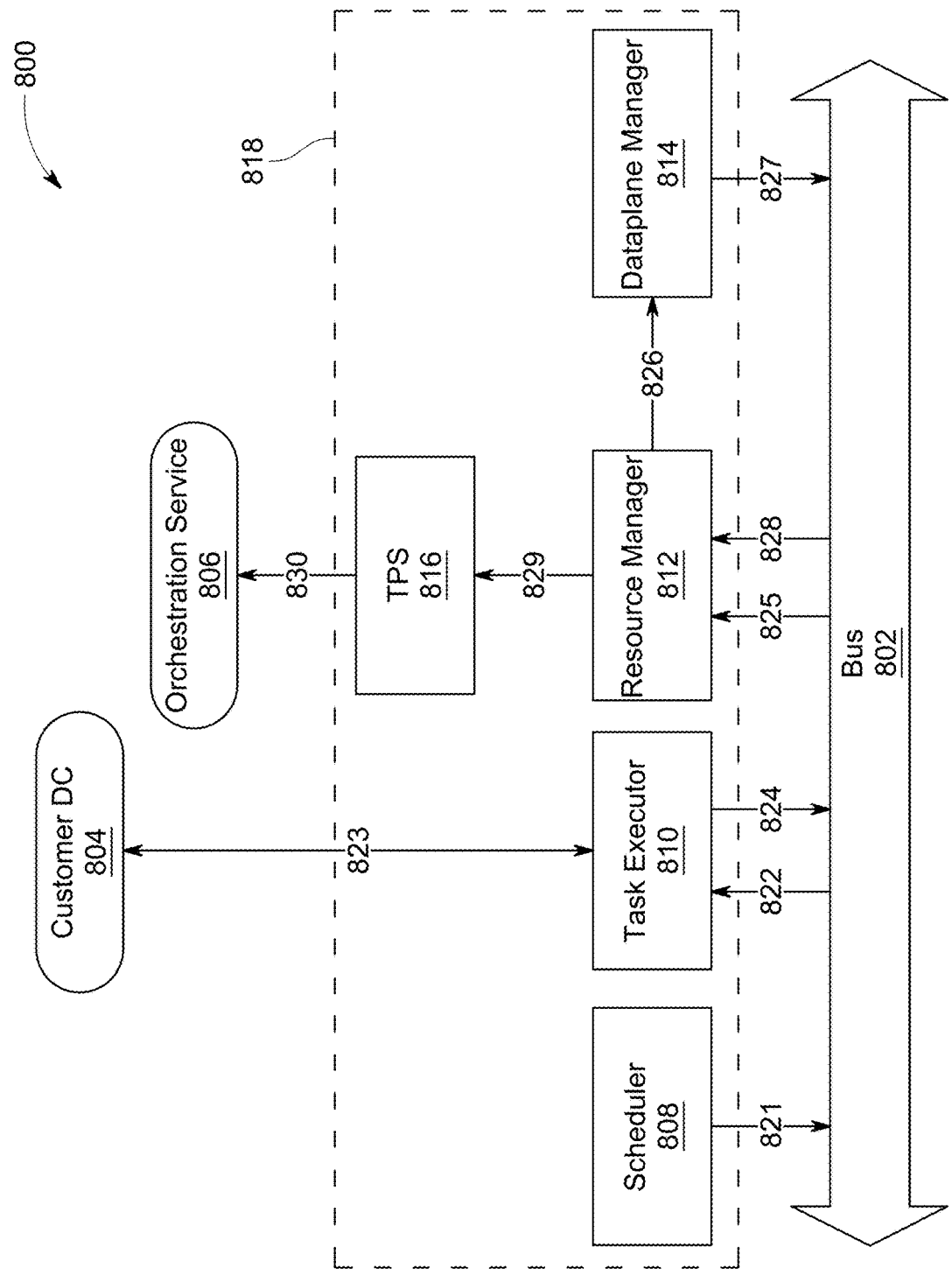
FIG. 8 is a diagram of a cloud inventory engine.

A cloud inventory engine, specifically the cloud inventory engine 302, was described with reference to FIG. 3. FIG. 8 is a diagram 800 of a cloud inventory engine. The diagram 800 includes a bus 802, a customer DC 804, and an orchestrator service 806 that may or may not be considered part of the cloud inventory engine (and the latter two are conceptually excluded in the example of FIG. 3). Included in the cloud inventory engine are a scheduler 808, a task executor 810, a resource manager 812, a dataplane manager 814, and a TPS 816, which are encompassed by the dashed box 818 for illustrative purposes. The arrows 821 to 830 represent the order of operations within (and to/from) the cloud inventory engine.

The scheduler 808 drops a task onto the bus 802, which, in a specific implementation, is a Kafka data bus, that is picked up by the task executor 810. The task executor 810 communicates with the customer DC 804 (e.g., an event monitoring and alerting engine, such as Prometheus) then drops a task onto the bus 802 that is picked up by the resource manager 812. The resource manager 812 provides information to the dataplane manager 814 that enables a decision regarding what task is needed on the dataplane and causes the dataplane manager 814 to drop a task onto the bus 802 to be picked up by the resource manager 812. The resource manager 812 provides information to the TPS 814, which communicates with the orchestration service 816 (which then takes relevant action on the dataplane).

Figure 9:
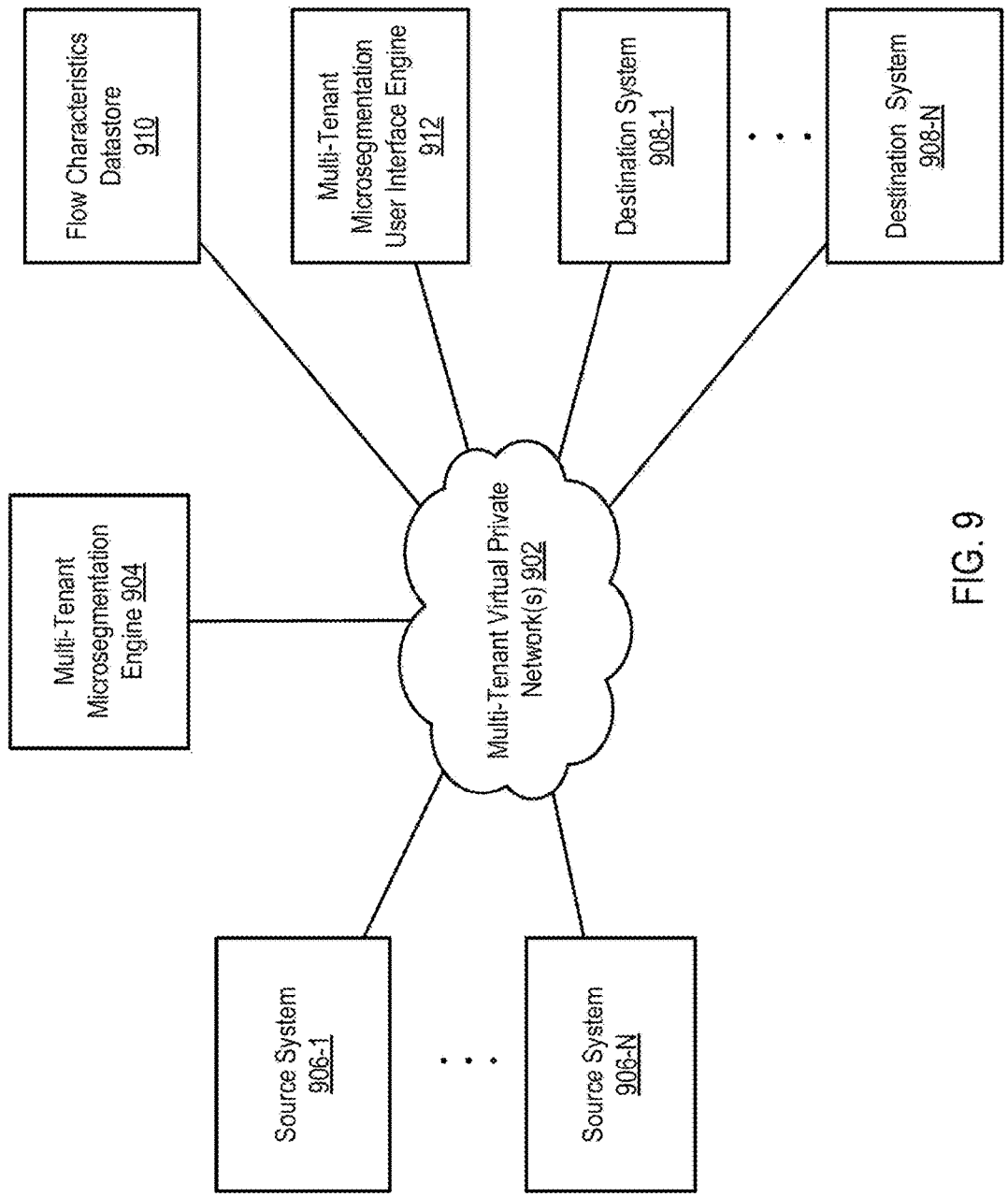
FIG. 9 is a diagram of a system for multi-tenant virtual private network (VPN) microsegmentation.

FIG. 9 is a diagram 900 of a system for multi-tenant virtual private network (VPN) microsegmentation. The diagram 900 includes a multi-tenant virtual private network 902, a multi-tenant microsegmentation engine 904 coupled to the multi-tenant virtual private network 902, source systems 906-1 to 906-N (individually, the source system 906, collectively, the source systems 906) coupled to the multi-tenant virtual private network 902, destination systems 908-1 to 908-N (individually, the destination system 908, collectively, the destination systems 908) coupled to the multi-tenant virtual private network 902, a flow characteristic datastore 910 coupled to the multi-tenant virtual private network 902, and a multi-tenant microsegmentation user interface engine 912 coupled to the multi-tenant virtual private network 902.

The multi-tenant virtual private network 902 is intended to represent one or more virtual private networks including and/or supporting multi-tenant architectures. For example, a tenant can be a group of one or more users or systems who can share access to a single instance of a system or a single instance of an application executing on a system. In one example, a tenant can be a customer (or a customer's representative) or a group of customers (or customer representatives).

In a specific implementation, the multi-tenant virtual private network 902 can include a plurality of access points and/or multiple subsets of access points. In one example, the multi-tenant virtual private network comprises a plurality of distinct virtual private networks, and each of the distinct virtual private networks can be associated with a particular tenant of the multi-tenant architecture. It will be appreciated that, in some embodiments, reference to a multi-tenant virtual private network can refer to the entire multi-tenant virtual private network 902 and/or portions thereof (e.g., one or more virtual private networks of the multi-tenant virtual private network 902).

The multi-tenant microsegmentation engine 904 is intended to represent an engine that provides, supports, and/or otherwise facilitates network microsegmentation (e.g., of the multi-tenant virtual private network 902). It will be appreciated that network microsegmentation (or, simply, microsegmentation) is different from mere network segmentation. For example, microsegmentation cannot typically be performed within virtual private networks, let alone multi-tenant virtual private networks, and can provide increased and more granular control relative to traditional network segmentation. Accordingly, the systems and methods described herein provide a technological improvement relative to other networking architectures and/or networking systems.

In a specific implementation, the multi-tenant microsegmentation engine 904 can function to provide increased control, flexibility, and speed relative to traditional networking approaches. For example, rather than manually programming various hardware devices, users (e.g., administrators and/or developers) can control flows over the multi-tenant virtual private network 902 by programming an open standard software-based controller (e.g., the multi-tenant microsegmentation engine 904 and/or portion thereof). Users can also have increased flexibility in selecting networking equipment, since the users can choose a single protocol to communicate with any number of hardware devices through the multi-tenant microsegmentation engine 904.

In a specific implementation, the multi-tenant microsegmentation engine 904 can function to provide a customizable multi-tenant network infrastructure. For example, the multi-tenant microsegmentation engine 904 can configure network services and/or allocate resources (e.g., virtual resources) to change an infrastructure of the multi-tenant virtual private network 902 in real-time through one centralized location (e.g., the multi-tenant microsegmentation engine 904). This can allow, for example, users to optimize flows through the multi-tenant virtual private network 902 and/or prioritize applications that require more availability. In a specific implementation, the multi-tenant virtual private network 902 and/or multi-tenant microsegmentation engine 904 can be a single server for all tenants.

In a specific implementation, the multi-tenant microsegmentation engine 904 can function to provide improved security relative to traditional network solutions. For example, the multi-tenant microsegmentation engine 904 can provide improved visibility into the entire multi-tenant virtual private network 902, thereby making it easier to prevent, identify, and/or respond to security threats. In a specific implementation, the multi-tenant microsegmentation engine 904 can create separate zones for systems or devices that require different levels of security, and/or immediately quarantine compromised systems or devices so that they cannot compromise other portions of the multi-tenant virtual private network 902. It will be appreciated that some or all of the features of the multi-tenant microsegmentation engine 904 can be performed autonomously (e.g., without requiring user input) and/or manually (e.g., by an administrator interacting with the multi-tenant microsegmentation user interface engine 912).

In a specific implementation, the multi-tenant microsegmentation engine 904 and/or the multi-tenant virtual private network 902 is software-based (e.g., as opposed to hardware-based). In a software-based implementation, the system can achieve improved flexibility relative to traditional networking. For example, the multi-tenant microsegmentation engine 904 can allow administrators to control the multi-tenant virtual private network 902 (e.g., via the multi-tenant microsegmentation user interface engine 912), change configuration settings (e.g., via the multi-tenant microsegmentation user interface engine 912), provision resources (e.g., via the multi-tenant microsegmentation user interface engine 912), assign network addresses (e.g., IP addresses, IP prefixes) and/or microsegments for flows and/or users (e.g., via the multi-tenant microsegmentation user interface engine 912), and increase network capacity (e.g., via the multi-tenant microsegmentation user interface engine 912). In a specific implementation, the multi-tenant microsegmentation engine 904 can dynamically allocate subnets per tenant and/or per microsegment.

In a specific implementation, it will be appreciated that the multi-tenant microsegmentation engine 904 can perform the functions described herein within one or more virtual private networks, other types of private networks, multi-tenant networks, and/or the like. Accordingly, for example, the multi-tenant engine 904 can function to perform operations in parallel across one or more virtual private networks. For example, operations executed with respect a particular tenant and/or a particular flow (e.g., in a particular virtual private network of the multi-tenant virtual private network 902) can be performed in parallel with operations executed with respect to another tenant and/or another flow (e.g., in another virtual private network of the multi-tenant virtual private network 902).

In a specific implementation, the multi-tenant microsegmentation engine 904 can function to tag flows. More specifically, the multi-tenant microsegmentation engine 904 can function to simultaneously and/or in parallel tag flows for each tenant of the multi-tenant virtual private network 902 and across one or more networks of the multi-tenant virtual private network 902. For example, the multi-tenant microsegmentation engine 904 can apply routing tags that include internet protocol (IP) prefixes, such as slash 16 prefixes, that are associated with a particular subnet of the multi-tenant virtual private network 902 and/or a particular subnet of a particular network of the multi-tenant virtual private network 902. The multi-tenant microsegmentation engine 904 can use the tags to track (e.g., continuously track) flows, determine flow paths from source systems 906 to destination systems 908, determine reverse flow paths from destination systems 908 to source systems 906, and/or the like. In a specific implementation, the multi-tenant microsegmentation engine 904 includes and/or maintains a routing table (e.g., including tag information) to determine flow paths, return flow paths, and/or other features described herein.

In a specific implementation, the multi-tenant microsegmentation engine 904 can function to capture flow characteristics. For example, flow characteristics can include source information, destination information, timestamps, subnet information, virtual private network information, tenant information, process information, transformation information, resource information, and/or the like. Flow characteristics can also include the flow path, return flow path, subnet information, microsegment information, and/or the like. The multi-tenant microsegmentation engine 904 can store, maintain and/or otherwise manage flow characteristics in the flow characteristics datastore 910. In a specific implementation, the multi-tenant microsegmentation engine 904 can function to categorize flows. For example, the multi-tenant microsegmentation engine 904 can categorize flows based on some or flow characteristics of a flow. Categories can include, for example, user groups (e.g., a sales group, an engineering group, a non-engineering group), users or user groups having particular permissions (e.g., permission to access various resources or network locations), and/or the like. In a specific implementation, segmentation can be based on user (or user group) credentials.

In a specific implementation, the multi-tenant microsegmentation engine 904 can function to transmit and receive data. For example, the multi-tenant microsegmentation engine 904 can transmit flow characteristics to the flow characteristic datastore 910, flow categorizations to the multi-tenant microsegmentation user interface engine 912, receive policies from the multi-tenant microsegmentation user interface engine 912, and/or the like. Policies can include security policies, routing policies (e.g., associated with a routing table), bandwidth throttling policies, resource access/restriction policies, and/or other policies implementing the other features described above and elsewhere herein.

In a specific implementation, the multi-tenant microsegmentation engine 904 can function to enforce policies on flows. In some embodiments, the combination of tagging flows and enforcing policies on flows provides the structures that allows microsegmentation within the multi-tenant virtual private network 902. For example, the tagging and continuous tracking can allow the policies to include more granular control than traditional network segmentation, and provide the additional features discussed above and elsewhere herein.

In a specific implementation, the multi-tenant microsegmentation engine 904 can function to generate, transmit, and/or receive notifications. For example, the multi-tenant microsegmentation engine 904 can function to notify tenants, customers, and/or administrators of flow path information, flow characteristics, policy information, policy enforcement information, and/or the like.

In a specific implementation, the multi-tenant microsegmentation engine 904 can function to spin-up and spin-down virtual private networks (e.g., of the multi-tenant virtual private network 902). For example, the multi-tenant microsegmentation engine 904 can spin-up virtual private networks based on geographic region, such as a first virtual private network of the multi-tenant virtual private network 902 for tenant(s) on the East Coast of the United States, and another virtual private network of the multi-tenant virtual private network 902 for tenant(s) on the West Coast of the United States.

Figure 12:
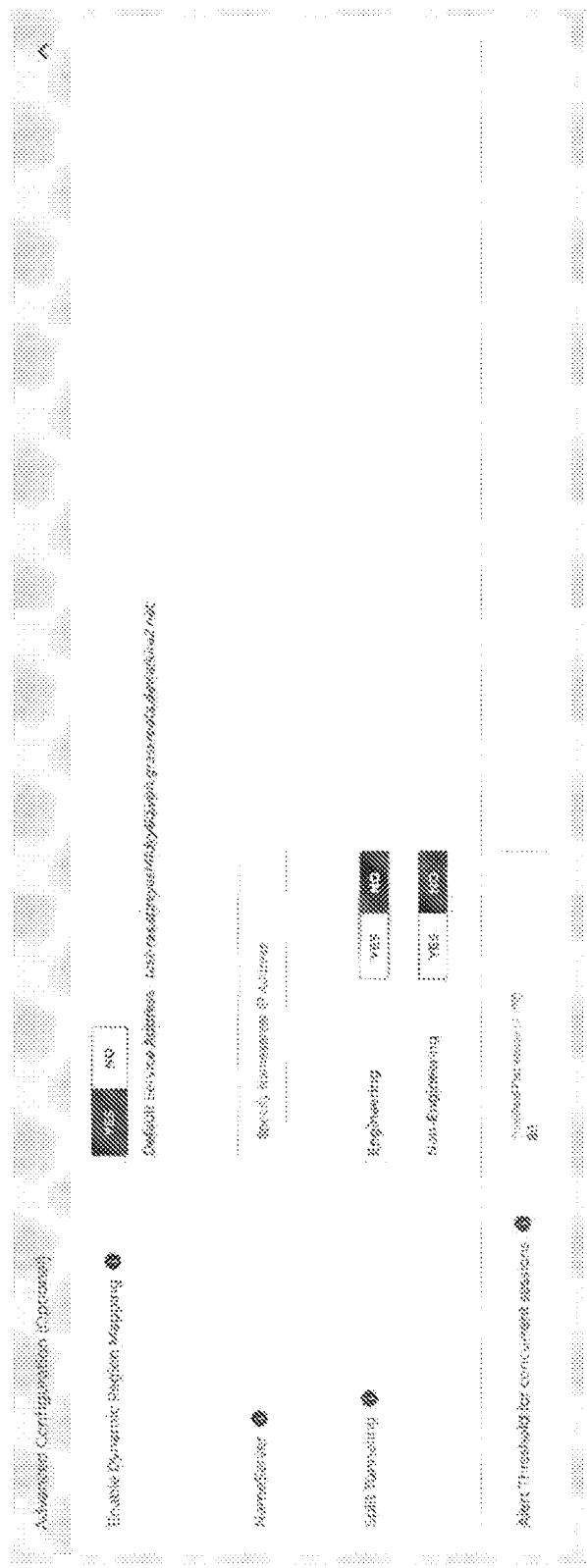
FIGS. 12-14 are example screenshots of example microsegmentation user interfaces.
Figure 13:
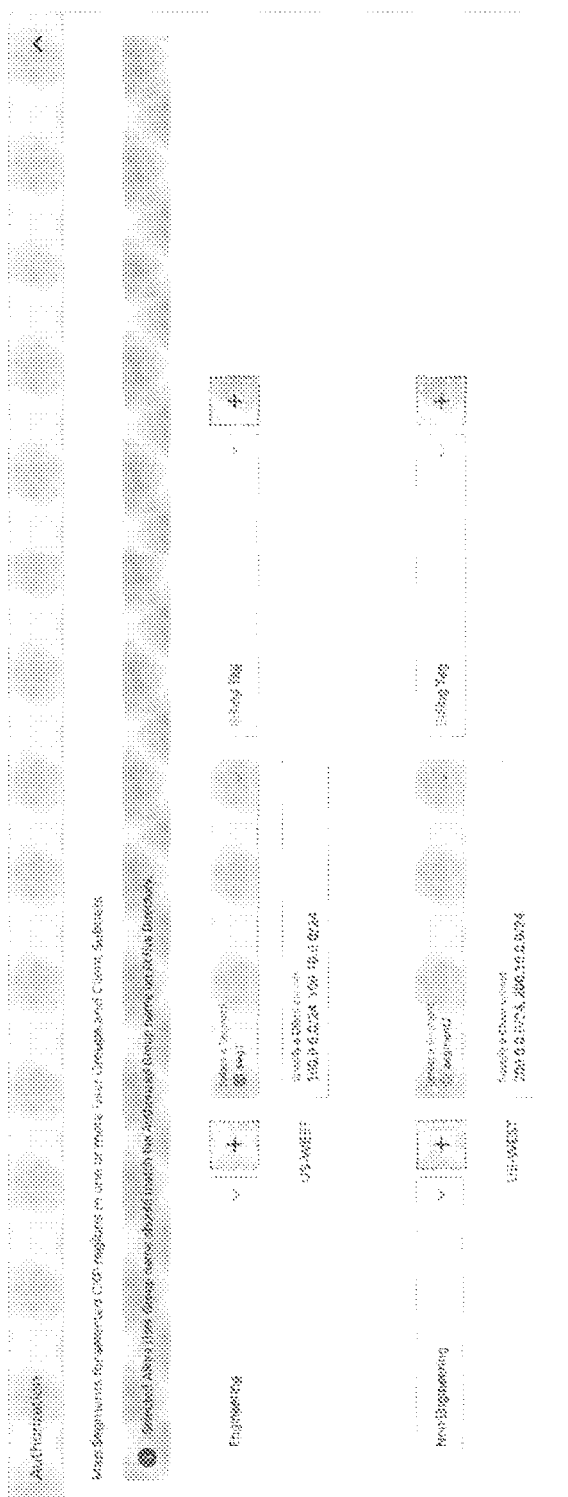
Figure 14:
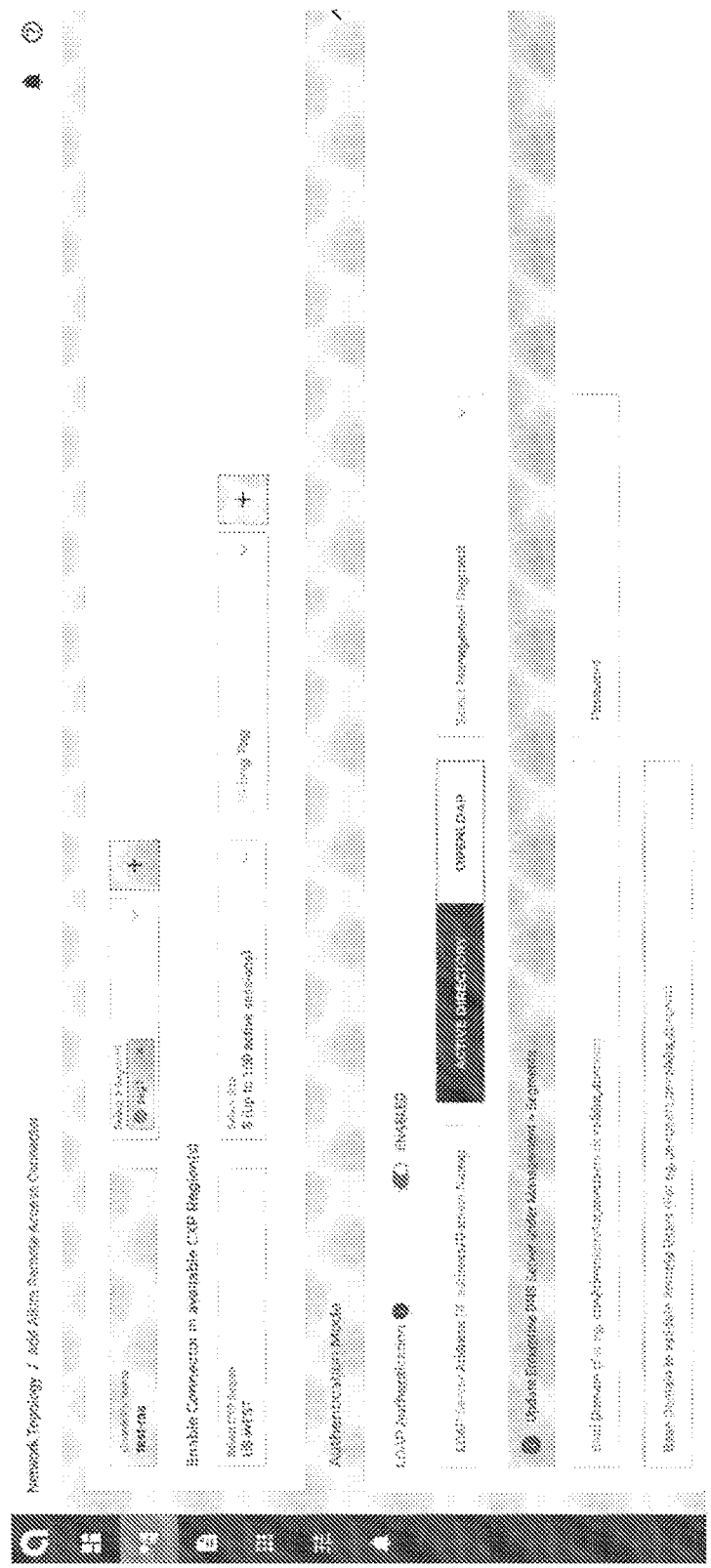

The multi-tenant microsegmentation user interface engine 912 is intended to represent an engine that allows users (e.g., administrators, developers) to control and/or interface with the multi-tenant virtual private network 902, and systems and engines associated therewith (e.g., multi-tenant microsegmentation engine 904). More specifically, the multi-tenant microsegmentation user interface engine 912 can interact with other systems and engines (e.g., the multi-tenant microsegmentation engine 904) to provide an increased level of control relative to traditional network segmentation controls. In a specific implementation, the multi-tenant microsegmentation user interface engine 912 can allow users to control the multi-tenant virtual private network 902 (by interacting the multi-tenant microsegmentation engine 904), assign network addresses (e.g., IP addresses, subnets), assign and/or define microsegments (e.g., to subnets, flows, users), change configuration settings, define policies, provision resources, define user groups, assign user groups, add tenants, remove tenants, and/or increase network capacity. In a specific implementation, the multi-tenant microsegmentation user interface engine 912 provides a graphical user interface that allows users to interact with the multi-tenant microsegmentation engine 904 to perform some or all of the functions of the multi-tenant microsegmentation engine 904. Example user interfaces are shown in FIGS. 12-14.

Figure 10A:
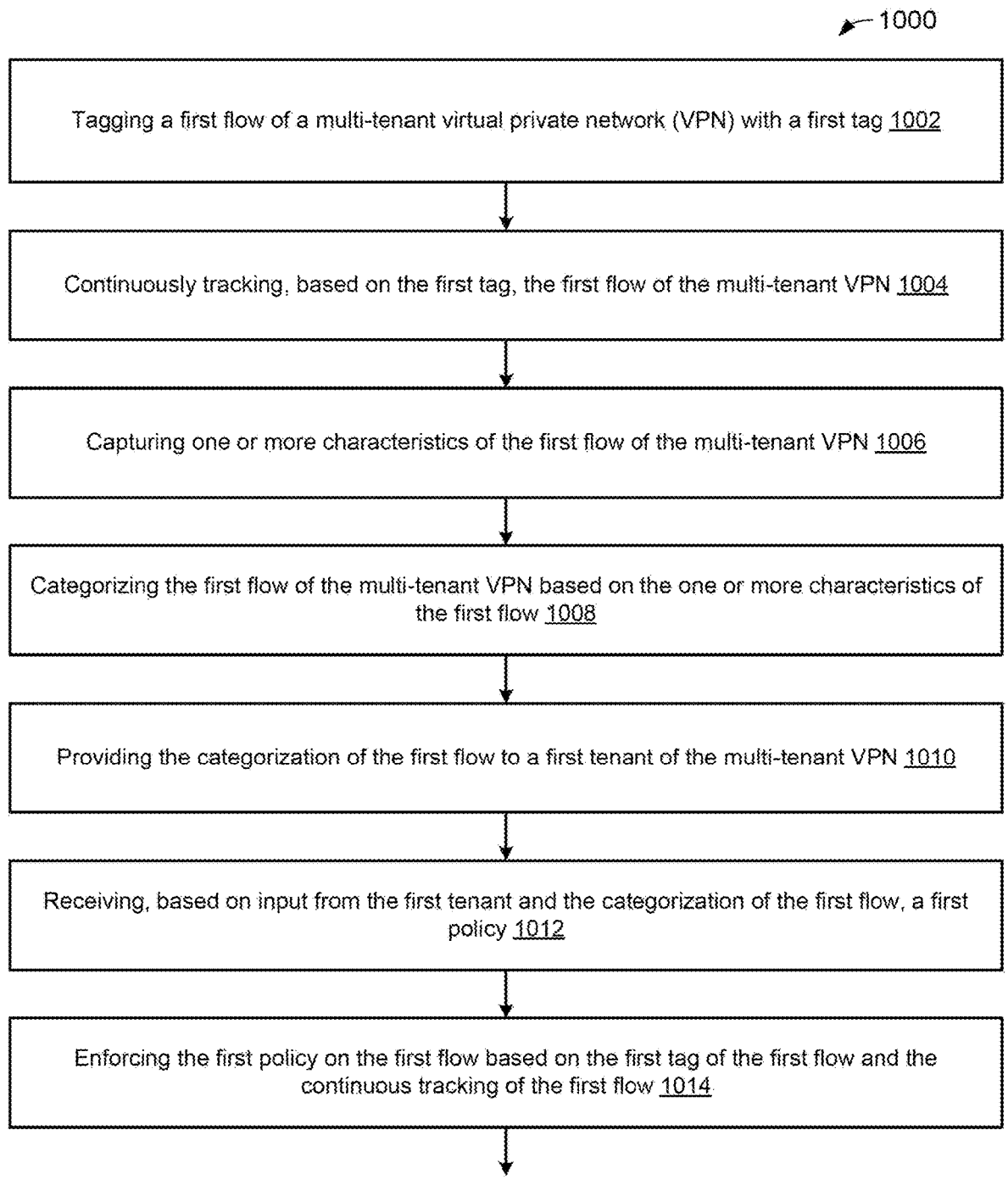
FIGS. 10A-B is a flowchart of a method of microsegmentation within a multi-tenant virtual private network.
Figure 10B:
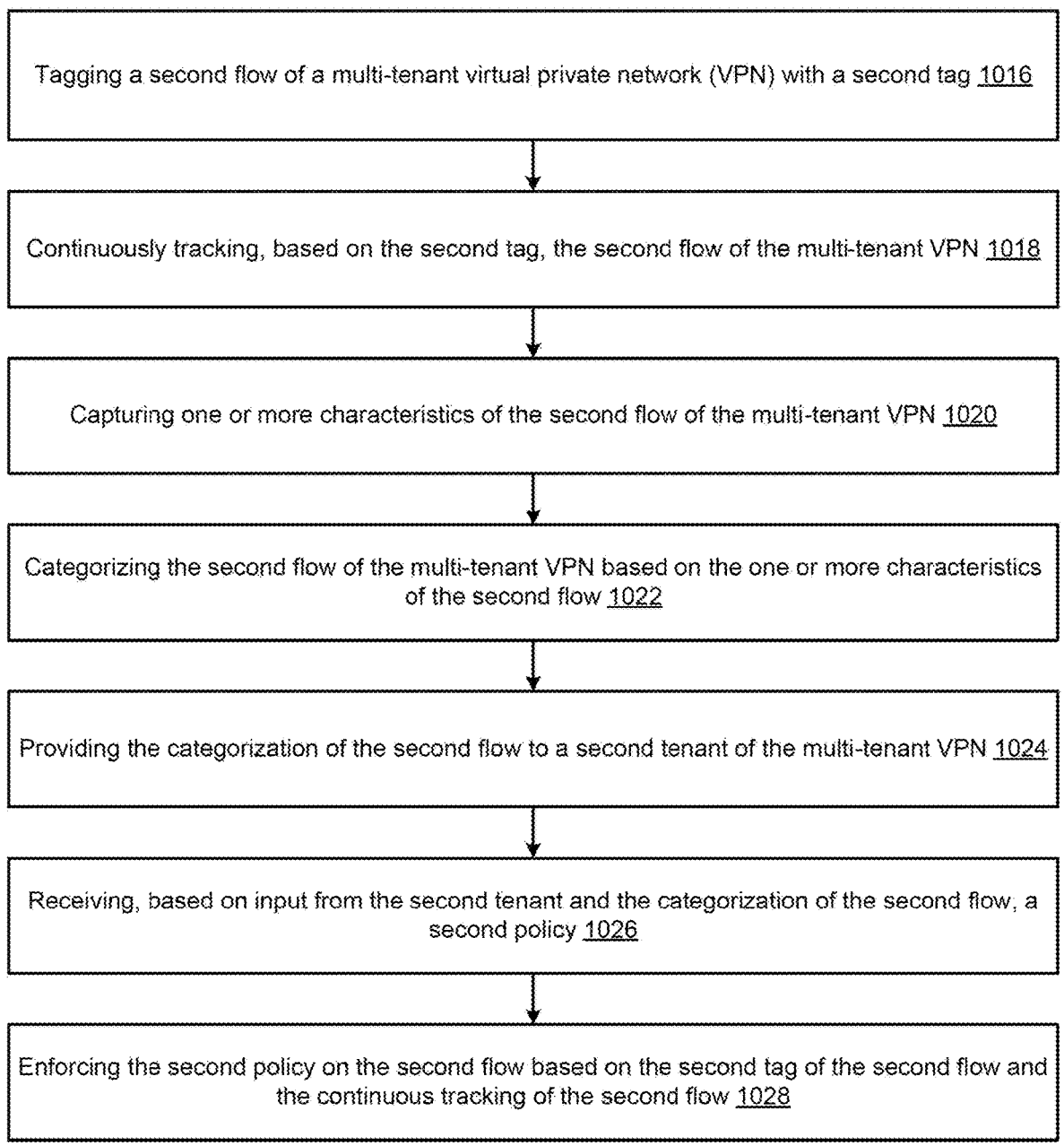

FIGS. 10A-B is a flowchart 1000 of a method of microsegmentation within a multi-tenant virtual private network. In this and other flowcharts, flow diagrams, and/or sequence diagrams, the flowchart illustrates by way of example a sequence of modules. It should be understood the modules may be reorganized for parallel execution, or reordered, as applicable. Moreover, some modules that could have been included may have been removed to avoid providing too much information for the sake of clarity and some modules that were included could be removed, but may have been included for the sake of illustrative clarity.

In module 1002, a multi-tenant microsegmentation engine tags a first flow of a multi-tenant virtual private network (VPN) with a first tag. In a specific implementation, the first tag can be a routing tag that is associated with a first subnet of a plurality of subnets of the multi-tenant VPN. For example, the first tag can include an internet protocol (IP) prefix, such as a slash 16 prefix. The first subnet can be associated with a first microsegment of a plurality of microsegments of the multi-tenant virtual private network.

In module 1004, the multi-tenant microsegmentation engine continuously tracks, based on the first tag, the first flow of the multi-tenant VPN.

In module 1006, the multi-tenant microsegmentation engine captures one or more characteristics of the first flow of the multi-tenant VPN.

In module 1008, the multi-tenant microsegmentation engine categorizes the first flow of the multi-tenant VPN based on the one or more characteristics of the first flow.

In module 1010, the multi-tenant microsegmentation engine provides the categorization of the first flow to a first tenant of the multi-tenant VPN.

In module 1012, the multi-tenant microsegmentation engine receives, based on input from the first tenant and the categorization of the first flow, a first policy. For example, the input can be received from a customer via a multi-tenant microsegmentation user interface, and the multi-tenant microsegmentation user interface can select, identify, define, and/or provide the first policy to the multi-tenant microsegmentation engine via the multi-tenant virtual private network.

In module 1014, the multi-tenant microsegmentation engine enforces the first policy on the first flow based on the first tag of the first flow and the continuous tracking of the first flow. For example, enforcing the first policy on the first flow can include blocking access to a resource associated with the first flow, throttling bandwidth associated with the first flow, and/or the like.

In module 1016, the multi-tenant microsegmentation engine tags a second flow of the multi-tenant virtual private network (VPN) with a second tag. For example, the second tag can be a routing tag associated with a second subnet of the plurality of subnets of the multi-tenant VPN. The second tag can include an IP prefix, such as a slash 16 prefix. In a specific implementation, the second subnet is associated with a second microsegment of the plurality of microsegments of the multi-tenant virtual private network. In one example, the first subnet is within a first virtual private network of the multi-tenant virtual private network and the second subnet is within a second virtual private network of the multi-tenant virtual private network, and both can be managed, and/or otherwise perform the functionality described herein, simultaneously and in parallel by the multi-tenant microsegmentation engine.

In module 1018, the multi-tenant microsegmentation engine continuously tracking, based on the second tag, the second flow of the multi-tenant VPN.

In module 1020, the multi-tenant microsegmentation engine captures one or more characteristics of the second flow of the multi-tenant VPN.

In module 1022, the multi-tenant microsegmentation engine categorizes the second flow of the multi-tenant VPN based on the one or more characteristics of the second flow.

In module 1024, provides the categorization of the second flow to a second tenant of the multi-tenant VPN.

In module 1026, the multi-tenant microsegmentation engine receives, based on input from the second tenant and the categorization of the second flow, a second policy. For example, the input can be received from a second customer via the multi-tenant microsegmentation user interface, and the multi-tenant microsegmentation user interface can select, identify, define, and/or provide the second policy to the multi-tenant microsegmentation engine via the multi-tenant virtual private network.

In module 1028, the multi-tenant microsegmentation engine enforces the second policy on the second flow based on the second tag of the second flow and the continuous tracking of the second flow. For example, enforcing the second policy on the second flow can include blocking access to the resource, throttling bandwidth associated with the second flow, and/or the like.

In some embodiments, the first flow of the multi-tenant VPN comprises a first flow of a first VPN of the multi-tenant VPN, and the second flow comprises a second flow of a second VPN of the multi-tenant VPN. In a specific implementation, any of the modules of method 1000 that are performed with respect to the first flow can be performed in parallel with the modules of method 1000 that are performed with respect the second flow.

Figure 11:
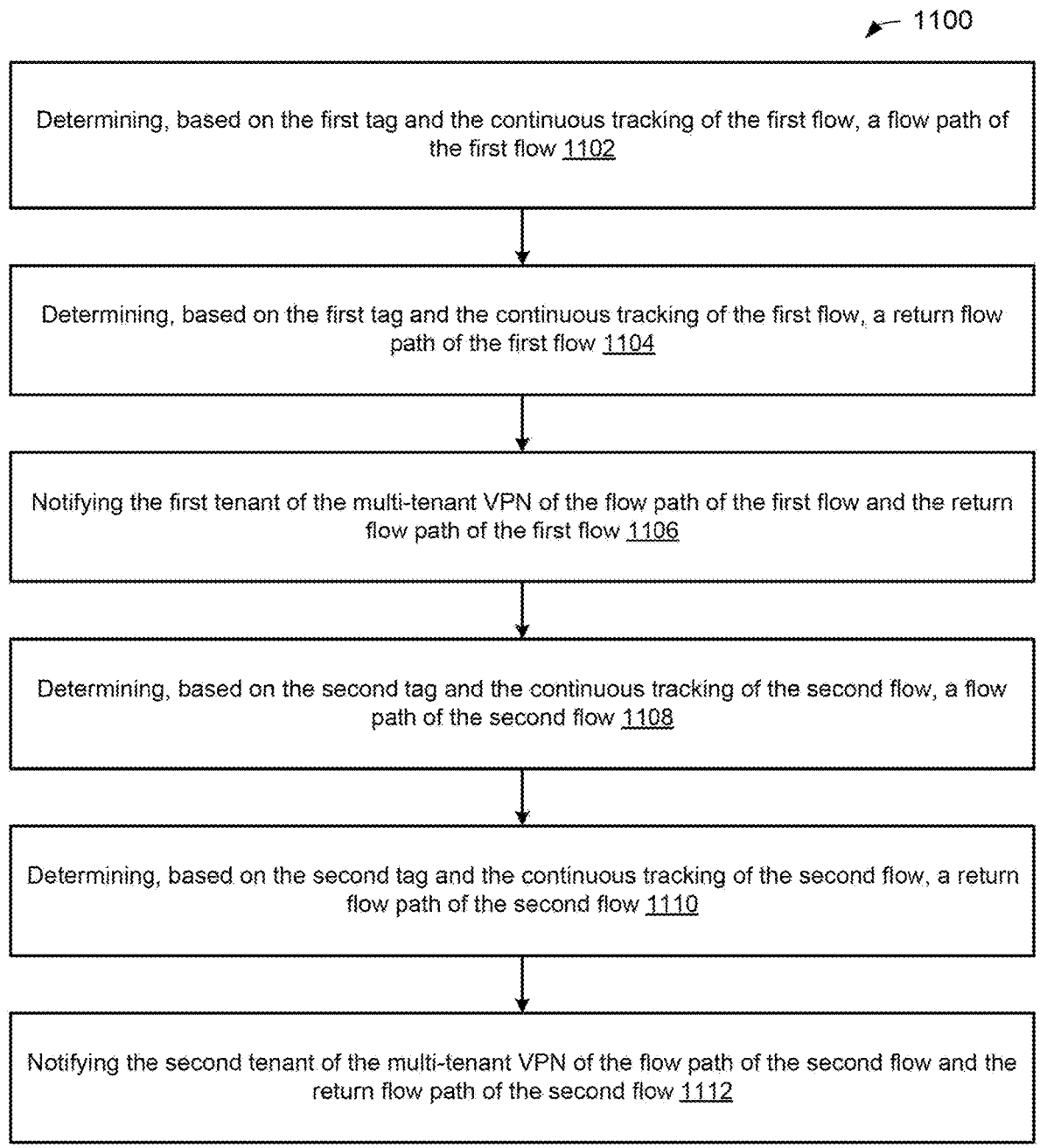
FIG. 11 is a flowchart of a method of determining flow paths within a multi-tenant virtual private network.

FIG. 11 is a flowchart 1100 of a method of determining flow paths within a multi-tenant virtual private network. In this and other flowcharts, flow diagrams, and/or sequence diagrams, the flowchart illustrates by way of example a sequence of modules. It should be understood the modules may be reorganized for parallel execution, or reordered, as applicable. Moreover, some modules that could have been included may have been removed to avoid providing too much information for the sake of clarity and some modules that were included could be removed, but may have been included for the sake of illustrative clarity.

In module 1102, the multi-tenant microsegmentation engine determines, based on the first tag and the continuous tracking of the first flow, a flow path of the first flow.

In module 1104, the multi-tenant microsegmentation engine determines, based on the first tag and the continuous tracking of the first flow, a return flow path of the first flow.

In module 1106, the multi-tenant microsegmentation engine notifies the first tenant of the multi-tenant VPN, and/or an administrator, of the flow path of the first flow and the return flow path of the first flow.

In module 1108, the multi-tenant microsegmentation engine determines, based on the second tag and the continuous tracking of the second flow, a flow path of the second flow.

In module 1110, the multi-tenant microsegmentation engine determines, based on the second tag and the continuous tracking of the second flow, a return flow path of the second flow.

In module 1112, the multi-tenant microsegmentation engine notifies the second tenant of the multi-tenant VPN, and/or the administrator, of the flow path of the second flow and the return flow path of the second flow.

FIGS. 12-14 are example microsegmentation user interfaces 1200-1400 that can be generated by the multi-tenant microsegmentation user interface engine 912 in some embodiments. For example, the example microsegmentation user interfaces 1200-1400 can be administrator user interfaces that an administrator can interact with third portion control flows, segments, the multi-tenant virtual private network 902, the multi-tenant microsegmentation engine 902, and/or the like. More specifically, the user interfaces can define routes/prefixes that can be reached over the VPN server based on user credentials and split traffic between the tunneled and non-tunneled routes (e.g., as shown in FIG. 12).

Figure 15:
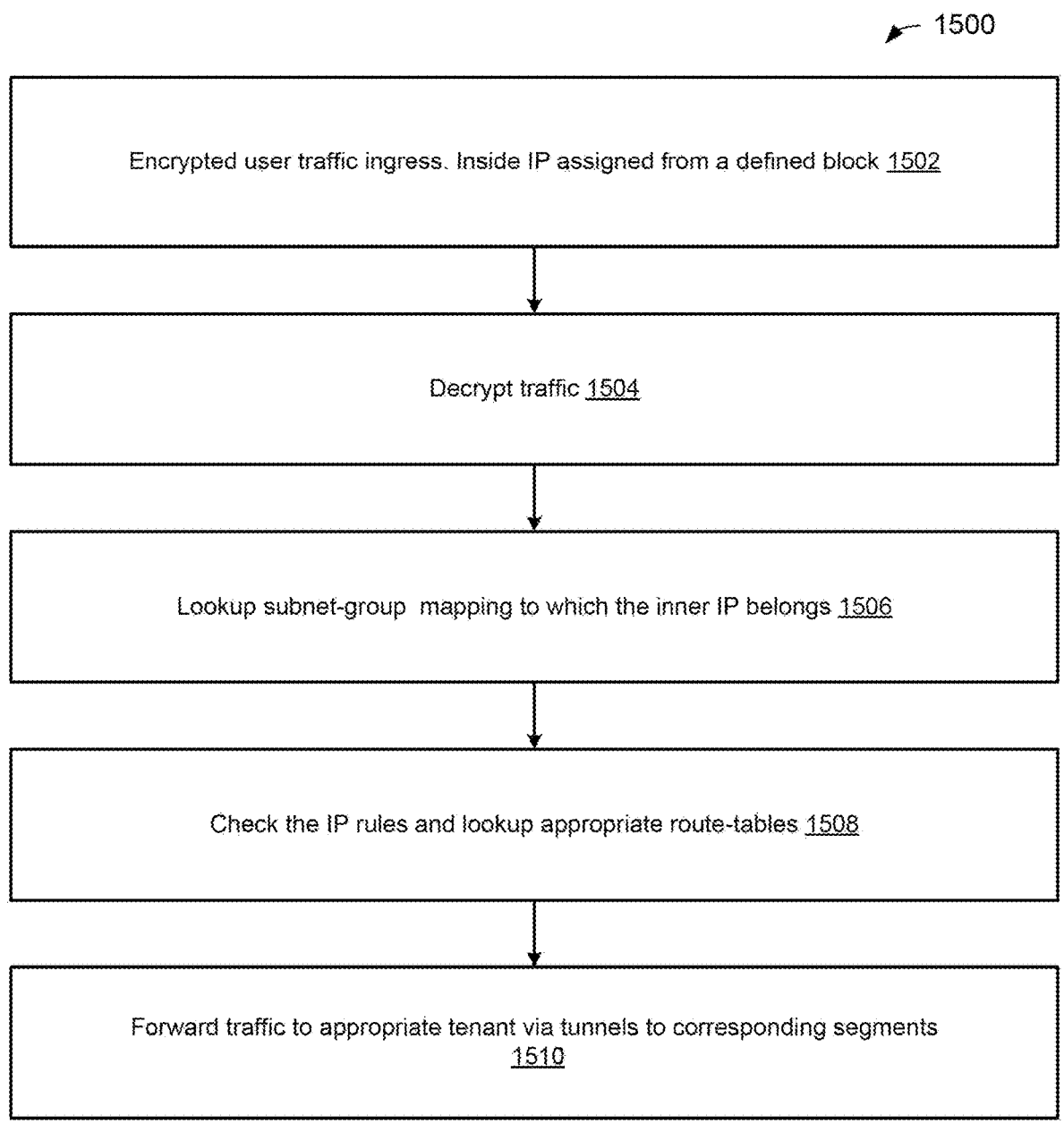
FIG. 15 is a flowchart of a method of operation of an example multi-tenant microsegmentation engine.

FIG. 15 is a flowchart of a method 1500 of operation of an example multi-tenant microsegmentation engine. In this and other flowcharts, flow diagrams, and/or sequence diagrams, the flowchart illustrates by way of example a sequence of modules. It should be understood the modules may be reorganized for parallel execution, or reordered, as applicable. Moreover, some modules that could have been included may have been removed to avoid providing too much information for the sake of clarity and some modules that were included could be removed, but may have been included for the sake of illustrative clarity.

In module 1502, a multi-tenant microsegmentation engine detects encrypted user traffic at ingress and/or assigns an inner IP address from a defined block.

In module 1504, the multi-tenant microsegmentation engine decrypts the encrypted user traffic.

In module 1506, the multi-tenant microsegmentation engine looks-up a subnet-group mapping to which the inner IP belongs.

In module 1508, the multi-tenant microsegmentation engine checks IP rules and looks-up appropriate routing tables.

In module 1510, the multi-tenant microsegmentation engine forwards traffic to appropriate tenant via tunnels to corresponding segments.

Figure 16:
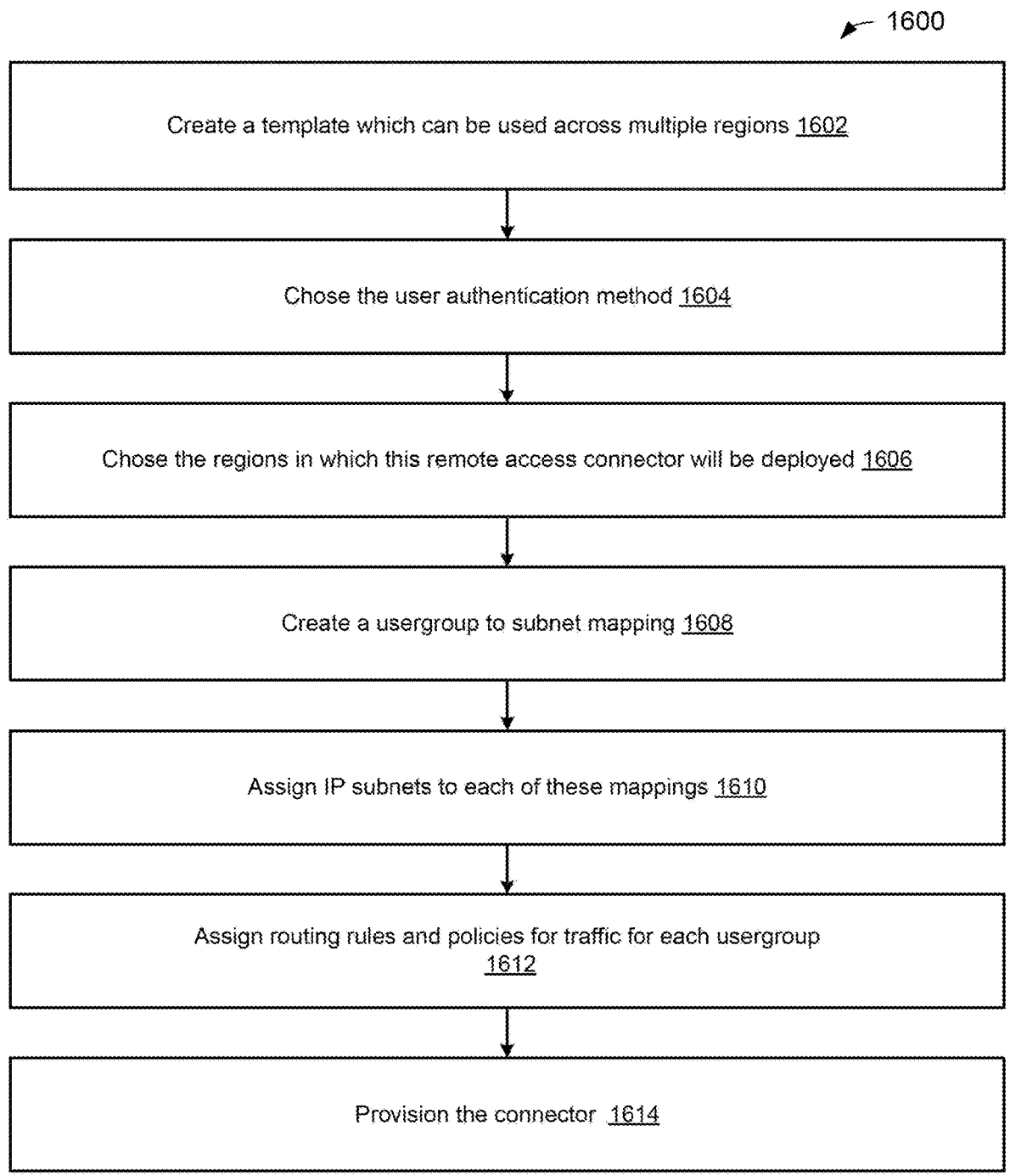
FIG. 16 is a flowchart of a method of a operation of an example multi-tenant microsegmentation engine.

FIG. 16 is a flowchart of a method 1600 of a operation of an example multi-tenant microsegmentation engine. In this and other flowcharts, flow diagrams, and/or sequence diagrams, the flowchart illustrates by way of example a sequence of modules. It should be understood the modules may be reorganized for parallel execution, or reordered, as applicable. Moreover, some modules that could have been included may have been removed to avoid providing too much information for the sake of clarity and some modules that were included could be removed, but may have been included for the sake of illustrative clarity.

In module 1602, a multi-tenant microsegmentation engine creates a template which can be used across multiple regions.

In module 1604, the multi-tenant microsegmentation engine chooses a user authentication method.

In module 1606, the multi-tenant microsegmentation engine choses the region in which this remote access connector will be deployed.

In module 1608, the multi-tenant microsegmentation engine creates a user group to subnet mapping.

In module 1610, the multi-tenant microsegmentation engine assigns IP subnets to each of the mappings.

In module 1612, the multi-tenant microsegmentation engine assigns routing rules and/or policies for traffic for each user group.

In module 1614, the multi-tenant microsegmentation engine provisions the connector.

What is claimed is:

1. A system comprising:
one or more processors; and
memory storing instructions that, when executed by the one or more processors, cause the system to perform:
tagging a first flow of a multi-tenant virtual private network (VPN) with a first tag;
continuously tracking the first flow of the multi-tenant VPN based on the first tag;
categorizing the first flow of the multi-tenant VPN;
providing the categorization of the first flow to a first tenant of the multi-tenant VPN;
receiving, based on input from the first tenant and the categorization of the first flow, a first policy; and
enforcing the first policy on the first flow based on the first tag of the first flow and the continuous tracking of the first flow.

2. The system of claim 1, wherein the instructions further cause the system to perform capturing one or more characteristics of the first flow of the multi-tenant VPN.

3. The system of claim 2, wherein the instructions further cause the system to perform categorizing the first flow of the multi-tenant VPN based on the one or more characteristics of the first flow.

4. The system of claim 1, wherein the instructions further cause the system to perform:
tagging a second flow of the multi-tenant virtual private network (VPN) with a second tag;
continuously tracking, based on the second tag, the second flow of the multi-tenant VPN;
categorizing the second flow of the multi-tenant VPN;
providing the categorization of the second flow to a second tenant of the multi-tenant VPN;
receiving, based on input from the second tenant and the categorization of the second flow, a second policy; and
enforcing the second policy on the second flow based on the second tag of the second flow and the continuous tracking of the second flow.

5. The system of claim 4, wherein the instructions further cause the system to perform capturing one or more characteristics of the second flow of the multi-tenant VPN.

6. The system of claim 5, wherein the instructions further cause the system to perform categorizing the second flow of the multi-tenant VPN based on the one or more characteristics of the second flow.

7. The system of claim 4, wherein the first tag is associated with a first subnet of a plurality of subnets of the multi-tenant VPN, and the second tag is associated with a second subnet of the plurality of subnets of the multi-tenant VPN.

8. The system of claim 7, wherein the first subnet of the plurality of subnets of the multi-tenant VPN is associated with a first microsegment of a plurality of microsegments of the multi-tenant VPN, and the second subnet of the plurality of subnets of the multi-tenant VPN is associated with a second microsegment of the plurality of microsegments of the multi-tenant VPN.

9. The system of claim 4, wherein the first tag comprises a first internet protocol (IP) prefix, and the second tag comprises a second IP prefix.

10. The system of claim 9, wherein the first IP prefix comprises a first slash 16 prefix, and the second IP prefix comprises a second slash 16 prefix.

11. The system of claim 4, wherein the first tag comprises a first routing tag, and the second tag comprises a second routing tag.

12. The system of claim 4, wherein the enforcing the first policy on the first flow comprises any of blocking access to a resource associated with the first flow and throttling bandwidth associated with the first flow, and wherein the enforcing the second policy on the second flow comprises any of blocking access to the resource and throttling bandwidth associated with the second flow.

13. The system of claim 4, wherein the first flow of the multi-tenant VPN comprises a first flow of a first VPN of the multi-tenant VPN, and the second flow comprises a second flow of a second VPN of the multi-tenant VPN, and wherein the operations performed with respect to the first flow are performed in parallel with the operations performed with respect the second flow.

14. A method implemented by a computing system including one or more processors and storage media storing machine-readable instructions, wherein the method is performed using the one or more processors, the method comprising:
tagging a first flow of a multi-tenant virtual private network (VPN) with a first tag;
continuously tracking the first flow of the multi-tenant VPN based on the first tag;
categorizing the first flow of the multi-tenant VPN;
providing the categorization of the first flow to a first tenant of the multi-tenant VPN;
receiving, based on input from the first tenant and the categorization of the first flow, a first policy; and
enforcing the first policy on the first flow based on the first tag of the first flow and the continuous tracking of the first flow.

15. The method of claim 14, further comprising capturing one or more characteristics of the first flow of the multi-tenant VPN.

16. The method of claim 15, wherein categorizing the first flow of the multi-tenant VPN being based on the one or more characteristics of the first flow.

17. The method of claim 14, further comprising
tagging a second flow of the multi-tenant virtual private network (VPN) with a second tag;
continuously tracking, based on the second tag, the second flow of the multi-tenant VPN;
categorizing the second flow of the multi-tenant VPN;
providing the categorization of the second flow to a second tenant of the multi-tenant VPN;
receiving, based on input from the second tenant and the categorization of the second flow, a second policy; and enforcing the second policy on the second flow based on the second tag of the second flow and the continuous tracking of the second flow.

18. The method of claim 17, further comprising capturing one or more characteristics of the second flow of the multi-tenant VPN.

19. The method of claim 18, wherein categorizing the second flow of the multi-tenant VPN being based on the one or more characteristics of the second flow.

20. The system of claim 17, wherein the first tag is associated with a first subnet of a plurality of subnets of the multi-tenant VPN, and the second tag is associated with a second subnet of the plurality of subnets of the multi-tenant VPN.

* * * * *